United States Patent
Tseng

(10) Patent No.: US 11,477,066 B2
(45) Date of Patent: Oct. 18, 2022

(54) PACKET DETECTION METHOD AND COMMUNICATION DEVICE

(71) Applicant: Realtek Semiconductor Corporation, Hsinchu (TW)

(72) Inventor: Chi-Hsiang Tseng, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 261 days.

(21) Appl. No.: 16/908,841

(22) Filed: Jun. 23, 2020

(65) Prior Publication Data

US 2021/0135923 A1 May 6, 2021

(30) Foreign Application Priority Data

Nov. 5, 2019 (TW) .................................. 108140141

(51) Int. Cl.
*H04L 27/38* (2006.01)
*H04L 43/16* (2022.01)
*H04L 27/26* (2006.01)

(52) U.S. Cl.
CPC ...... *H04L 27/3881* (2013.01); *H04L 27/2663* (2013.01); *H04L 27/2675* (2013.01); *H04L 43/16* (2013.01)

(58) Field of Classification Search
CPC ............. H04L 27/2663; H04L 27/2675; H04L 27/3881; H04L 25/0216; H04L 25/0224; H04L 43/16
See application file for complete search history.

(56) References Cited

U.S. PATENT DOCUMENTS

| 6,049,577 A * | 4/2000 | Gothe ..................... H04L 7/041 370/514 |
| 2004/0137863 A1* | 7/2004 | Walton ................. H04B 7/0854 455/337 |
| 2008/0002794 A1* | 1/2008 | Wallace ............... H04W 52/286 375/345 |
| 2008/0165903 A1* | 7/2008 | Hooli .................. H04B 1/70753 375/E1.012 |
| 2010/0040044 A1* | 2/2010 | Izumi ...................... H04L 7/042 370/350 |
| 2017/0181097 A1* | 6/2017 | Ganesan ................ H04L 1/0045 |

FOREIGN PATENT DOCUMENTS

| CN | 105432049 B | 3/2019 |
| TW | 200847691 A | 12/2008 |

* cited by examiner

*Primary Examiner* — David B Lugo
(74) *Attorney, Agent, or Firm* — Locke Lord LLP; Tim Tingkang Xia, Esq.

(57) ABSTRACT

A packet detection method is disclosed. The packet detection method includes the following operations: receiving a wireless communication signal; calculating a delay correlation function of the wireless communication signal; calculating a delay related output value and a threshold value according to the delay correlation function; and determining whether the wireless communication signal satisfies a feature of a wireless network packet or not according to the delay related output value and the threshold value.

20 Claims, 3 Drawing Sheets

100

300

400

PACKET DETECTION METHOD AND COMMUNICATION DEVICE

CROSS-REFERENCE TO RELATED APPLICATION

This application claims the priority benefit of TAIWAN Application serial no. 108140141, filed Nov. 5, 2019, the full disclosure of which is incorporated herein by reference.

FIELD OF INVENTION

The invention relates to a packet detection method and a communication device. More particularly, the invention relates to a packet detection method and a communication device related to delay correlation.

BACKGROUND

The more common packet detection in current communication systems is accomplished by using the periodic characteristics of short training sequences. When the characteristics of the power of the received signal, the output value of the matching filter, and the delay correlation meet the specific conditions, the receiver determines that there are packets in the air which are being transmitted.

If the packet detection misjudges the interference or noise in the air as a packet, the real packet may be missed before the receiving end judges it as a false alarm, thereby reducing system performance. In the case of low signal to noise ratio (SNR), the delay correlation is most susceptible to interference from noise and affects the accuracy of packet detection. In order to reduce the probability of false alarms, the improvement of the delay correlation scheme will be very important.

SUMMARY

An aspect of this disclosure is to provide a packet detection method. The packet detection method includes the following operations: receiving a wireless communication signal; calculating a delay correlation function of the wireless communication signal; calculating a delay related output value and a threshold value according to the delay correlation function; and determining whether the wireless communication signal satisfies a feature of a wireless network packet or not according to the delay related output value and the threshold value.

Another aspect of this disclosure is to provide a communication device. The communication device includes a transceiver circuit and a processor. The transceiver circuit is configured to receive a wireless communication signal. The processor is configured to calculate a delay correlation function of the wireless communication signal, to calculate a delay related output value and a threshold value according to the delay correlation function, and to determine whether the wireless communication signal satisfies a feature of a wireless network packet according to the delay related output value and the threshold value.

Embodiments of the present disclosure provide a packet detection method and a communication device, by considering both amplitude and phase information from the delay correlation complex-valued output, the effect of combined detection is achieved. Since both of the output and the threshold value are derived from the delay correlation of the same source, compared with the traditional method, it is less affected by the input signal strength, interference size, noise, etc., thereby, it is more suitable for different noise environments.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
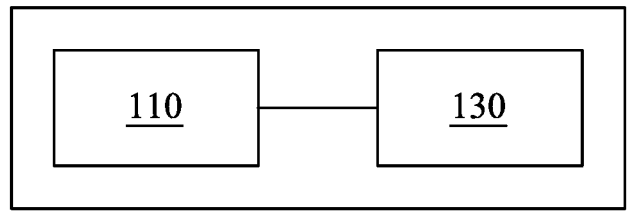
FIG. 1 is a schematic diagram illustrating a communication device according to some embodiments of the present disclosure.

The following disclosure provides many different embodiments, or examples, for implementing different features of the invention. Specific examples of elements and arrangements are described lower than to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed lower than, or elsewhere in the specification, to provide additional guidance to the practitioner regarding the description of the invention.

FIG. 1 is a schematic diagram illustrating a communication device 100 according to some embodiments of the present disclosure. The communication device 100 includes a transceiver circuit 110 and a processor 130. The transceiver circuit 110 is coupled to the processor 130.

Figure 2:
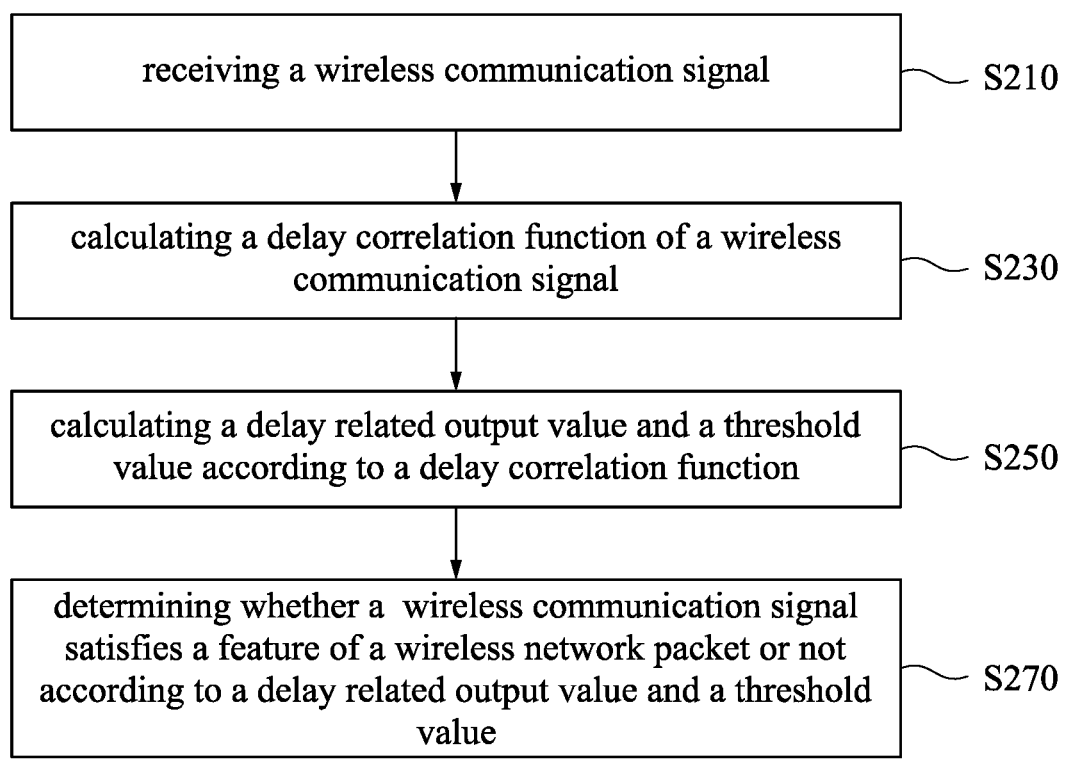
FIG. 2 is a flow chart illustrating a packet detection method according to some embodiments of the present disclosure.

Reference is made to FIG. 2. In order to better understand the present disclosure, the detailed operation of the communication device 100 will be described with the embodiment shown in FIG. 2. FIG. 2 is a flow chart illustrating a packet detection method 200 according to some embodiments of the present disclosure. It should be noted that, the packet detection method 200 may be applied to a device which is the same as or similar to the structure of the communication device 100 shown in FIG. 1. For ease of illustration, the embodiments of the packet detection method 200 mentioning in the following takes the embodiment of FIG. 1 for example. However, the embodiments of the present disclosure are not limited to the embodiment of FIG. 1.

FIG. 2 is a flow chart illustrating a packet detection method 200 according to some embodiments of the present disclosure.

Operation S210: receiving a wireless communication signal. In some embodiments, the operation S210 is operated by the transceiver circuit 110.

Operation S230: calculating a delay correlation function of a wireless communication signal. In some embodiments, the operation S230 is operated by the processor 130. In some embodiments, the delay correlation function is as following:

$$C(t) = \sum_{i=0}^{N_{rx}-1} a_i \cdot \left( \sum_{n=t}^{\tau+t-1} r_{i,n} \cdot r_{i,n-\tau}^* \right)$$

In the delay correlation function C(t) as mentioning above, $a_i$ is a weighting value of the i-th antenna, $r_{i,n}$ is the received wireless communication signal of the i-th antenna at the n-th time period, $\tau$ is a period of a STF (short training field), $N_{rx}$ is the total number of antennas of the transceiver circuit 110. It should be noted that, $r_{i,n}$ represents the wireless communication signal as a complex number form including a real part and an imaginary part, which includes information of amplitude and phase, and which is well known to those skilled in the art and will not be described in detail here. Furthermore, r* is a complex conjugate of r. From the above formula, people in the art may know that the function C(t) is a complex function, which includes information of amplitude and phase.

For ease of illustration and understanding, the following takes $N_{rx}=1$, $a_0=1$ as an example, so the delay correlation function C(t) may be rewritten as:

$$C(t) = \sum_{n=t}^{\tau+t-1} r_{0,n} \cdot r_{0,n-\tau}^*$$

It should be noted that, the embodiments of the present disclosure are not limited to the embodiment of $N_{rx}=1$, $a_0=1$, and in the following, $C_t$ represents C(t).

Figure 3:
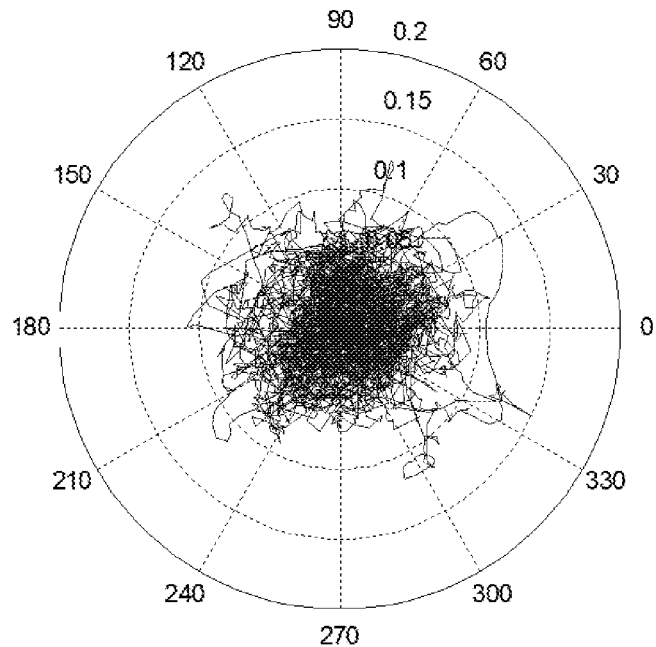
FIG. 3 is a schematic diagram illustrating a constellation point of the delay correlation function of the Gaussian white noise according to some embodiments of the present disclosure.

Reference is made to FIG. 3. FIG. 3 is a schematic diagram illustrating a constellation point 300 of the delay correlation function of the Gaussian white noise according to some embodiments of the present disclosure. As illustrated in FIG. 3, the distribution of the constellation point of the delay correlation function of the noise is randomly distributed in the whole circle. That is, for the noise, the phase of the delay correlation function is randomly distributed between 0 to 2 $\pi$.

Figure 4:
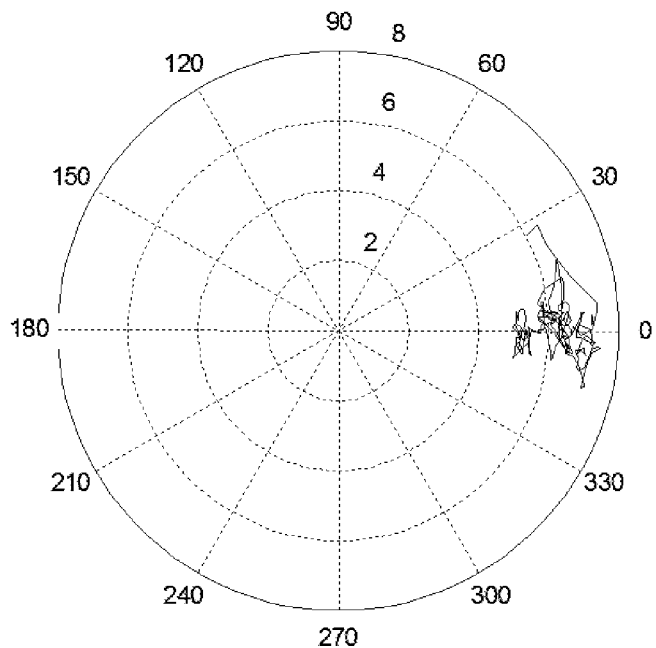
FIG. 4 is a schematic diagram illustrating a constellation point of the delay correlation function of the wireless network short training sequence packet according to some embodiments of the present disclosure.

Reference is made to FIG. 4. FIG. 4 is a schematic diagram illustrating a constellation point 400 of the delay correlation function of the wireless network short training sequence packet according to some embodiments of the present disclosure. As illustrated in FIG. 4, the distribution of the constellation point of the delay correlation function of the wireless network short training sequence packet focuses around a specific angle, the above angle is highly related to the Carrier Frequency Offset (CFO). That is, for the wireless network short training sequence packet, the distribution of the phase of the delay correlation function focuses at a specific angle.

According to the distribution diagram of FIG. 3 and FIG. 4 and the probability and statistic concept, the following method to determine noise or wireless network packet may be obtained. If the received wireless communication signal $r_{i,n}$ is a pure noise, the square of the average value (mean) $E[C_t]$ calculated according to the delay correlation function $C_t$ is less than its variation value(variance) $Var[C_t]$. In this situation, $|E[C_t]|^2 < Var[C_t]$. On the other hand, if $r_{i,n}$ is wireless network short training sequence packet, the square of the average value (mean) $E[C_t]$ calculated according to the delay correlation function C(t) is larger than its variation value(variance) $Var[C_t]$. In this situation, $|E[C_t]|^2 > Var[C_t]$. Therefore, if the received wireless communication signal satisfies the feature of $|E[C_t]|^2 > Var[C_t]$, it means that a wireless network short training sequence packet may be received, that is, a wireless network packet may be received. It should be noted that, the embodiment takes the short training sequence as an example, but the embodiments of the present disclosure are not limited thereto. As long as there is a periodic sequence in the wireless network packet, the method of the embodiments of the present disclosure is applicable.

The formula of the variation value $Var[C_t]$ is shown as following, wherein L is a time length parameter:

$$Var[C_t] = E[C_t^2] - |E[C_t]|^2 = \frac{1}{L}\sum_{t=0}^{L-1}\left|C_t^2\right| - \left|\frac{1}{L}\sum_{t=0}^{L-1}C_t\right|^2$$

The formula of the average value $E[C_t]$ is shown as following, wherein L is a time length parameter:

$$E[C_t] = \frac{1}{L}\sum_{t=0}^{L-1}C_t$$

As mentioning above, whether the received wireless communication signal is a noise or a wireless network packet may be determined according to the determination formula $|E[C_t]|^2 < Var[C_t]$ or $|E[C_t]|^2 > Var[C_t]$. It may be known from the above determination formula, in the embodiments of the present disclosure, when calculating the average value or the variance value, the delay correlation function $C_t$ is directly used for calculation, so not only the phase of the delay correlation function $C_t$ is taken into account, but the amplitude of the delay correlation function $C_t$ is considered. On the contrary, the conventional technology uses the size $|C_t|$ of the delay correlation function $C_t$ to determine the received signal and does not consider the phase of the delay correlation function $C_t$, in which the noise is easy to be misjudged as a wireless network packet.

In some embodiments, the determination formula mentioning above further includes parameter $\alpha$. For example, $$|E[C_t]|^2 \overset{>}{\underset{<}{}} \alpha \cdot Var[C_t].$$

In the formula, when the squared value $|E[C_t]|^2$ of the size of the average value is greater than the product $\alpha \cdot Var[C_t]$ of the parameter $\alpha$ and the variance value $Var[C_t]$, it is determined that a wireless network packet is detected, conversely, the received signal may be a noise or other undesired signals. When it is determined that a wireless network packet may be detected, the final determination may be performed in conjunction with other conventional judgment methods (such as the output value of a matching filter), which can greatly reduce the cases of misjudgment by the conventional judgment method. In some embodiments, when it is determined the received wireless communication signal is a wireless network packet, directly determines that it is a wireless network packet.

The determination formula as described above is further calculated as follows:

$$|E[C_t]|^2 \gtrless \alpha \cdot Var[C_t]$$

$$\Rightarrow \left| \frac{1}{L}\sum_{t=0}^{L-1} C_t \right|^2 \gtrless \alpha \cdot \left( \frac{1}{L}\sum_{t=0}^{L-1} |C_t^2| - \left| \frac{1}{L}\sum_{t=0}^{L-1} C_t \right|^2 \right)$$

$$\Rightarrow (1+\alpha)\left| \frac{1}{L}\sum_{t=0}^{L-1} C_t \right|^2 \gtrless \alpha \cdot \frac{1}{L}\sum_{t=0}^{L-1} |C_t^2|$$

$$\Rightarrow \left| \frac{1}{L}\sum_{t=0}^{L-1} C_t \right|^2 \gtrless \frac{\alpha}{(1+\alpha)} \frac{1}{L}\sum_{t=0}^{L-1} |C_t^2|$$

In the formula above, $$\left| \frac{1}{L}\sum_{t=0}^{L-1} C_t \right|^2$$

is the delay related output value, and $$\frac{\alpha}{(1+\alpha)} \frac{1}{L}\sum_{t=0}^{L-1} |C_t^2|$$

is the threshold value. In the formula above, both the left and right sides (delay related output value and threshold value) come from the delay correlation function $C_t$ of the same signal, so the setting of the parameter value α will not be affected by the input signal strength, interference size, noise, etc.

Reference is made to FIG. 2 again. Operation S250: calculating a delay related output value and a threshold value according to a delay correlation function. In some embodiments, FIG. 2 is operated by the processor 130.

In details, in some embodiments, the processor 130 calculates the average value of several delay sample values $C_t$ over a period of time according to the delay correlation function C(t). For example, assuming that the time length parameter L is 2. The processor 130 obtains the delay sample values $C_0$ and $C_1$ according to the delay correlation function C(t), and calculates the average value of the delay sample values $C_0$ and $C_1$. Next, the processor 130 calculates the squared value of the average value of the delay sample values $C_t$ to obtain the delay related output $$\left| \frac{1}{L}\sum_{t=0}^{L-1} C_t \right|^2.$$

On the other hand, in some embodiments, the processor 130 is configured to calculate squares of several power sample values $C_t$ according to the delay correlation function C(t) to obtain several power function value $C_t^2$, and the processor 130 is further configured to obtain the average value of the several power sample values $C_t^2$. The processor is further configured to multiply the average value of the power sample value $C_t^2$ and the threshold value parameter $$\frac{\alpha}{(1+\alpha)},$$

to obtain threshold value $$\frac{\alpha}{(1+\alpha)} \frac{1}{L}\sum_{t=0}^{L-1} |C_t^2|.$$

In some embodiments, the value of the threshold value parameter $$\frac{\alpha}{(1+\alpha)}$$

is between 0 and 1. When the value of the threshold value parameter $$\frac{\alpha}{(1+\alpha)}$$

is 1, the threshold value is $$\frac{1}{L}\sum_{t=0}^{L-1} |C_t^2|.$$

In the situation, the average value of the several power sample values $C_t^2$ calculated by the processor 130 according to the delay correlation function C(t) is the threshold value.

For example, assume that the value of the threshold value parameter $$\frac{\alpha}{(1+\alpha)}$$

is 1, the time length parameter L is 2. The processor 130 obtains square of several delay sample values $C_t$ according to the delay correlation function C(t) to obtain several power sample values $C_0^2$, $C_1^2$, and the processor 130 calculates the average value of several power sample value $C_0^2$, $C_1^2$ so as to obtain the threshold value $$\frac{1}{L}\sum_{t=0}^{L-1} |C_t^2|.$$

Operation S270: determining whether a wireless communication signal satisfies a feature of a wireless network packet or not according to a delay related output value and a threshold value. In some embodiments, operation S270 is operated by the processor 130. In some embodiments, in operation S270, whether the wireless communication signal is the wireless network packet or the noise is determined according to the delay related output value and the threshold value. In some embodiments, when the delay related output value $$\left|\frac{1}{L}\sum\nolimits_{t=0}^{L-1}C_t\right|^2$$

is larger than the threshold value $$\frac{\alpha}{(1+\alpha)}\frac{1}{L}\sum\nolimits_{t=0}^{L-1}|C_t^2|,$$

the wireless communication signal is determined to be the wireless network packet. On the other hand, when the delay related output value $$\left|\frac{1}{L}\sum\nolimits_{t=0}^{L-1}C_t\right|^2$$

is not larger than the threshold value $$\frac{\alpha}{(1+\alpha)}\frac{1}{L}\sum\nolimits_{t=0}^{L-1}|C_t^2|,$$

the wireless communication signal is determined to be the noise.

Figure 5:
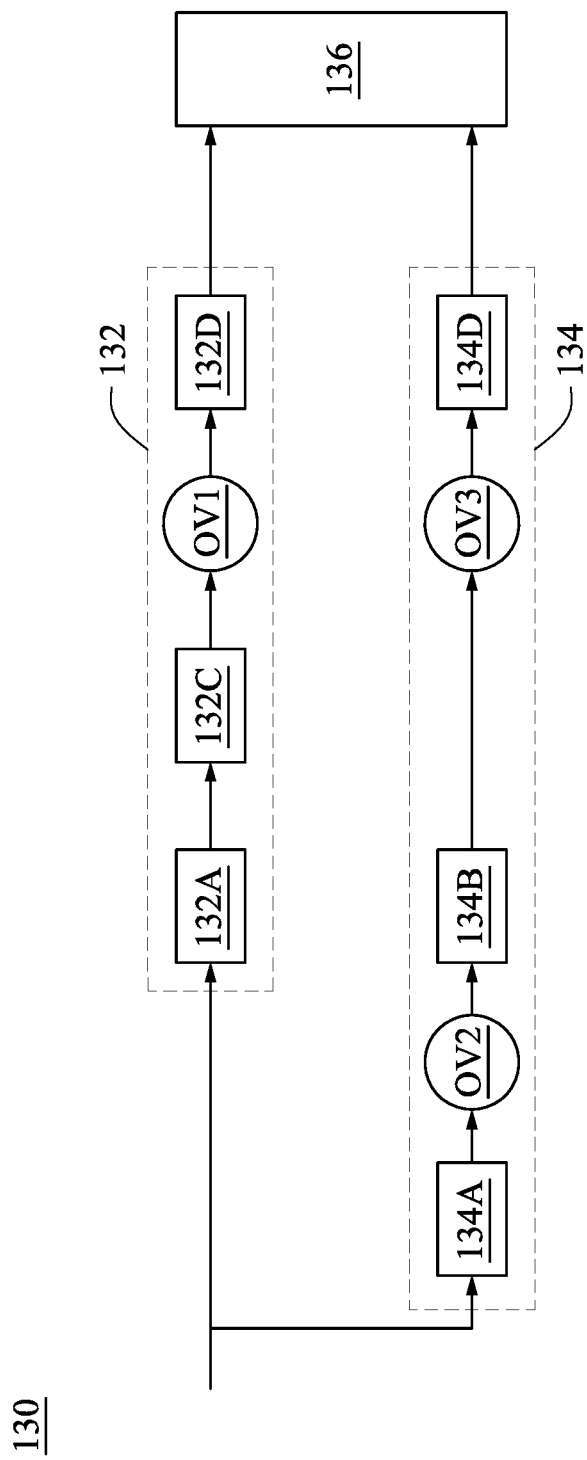
FIG. 5 is a schematic diagram illustrating a processor according to some embodiments of the present disclosure.

Reference is made to FIG. 5. FIG. 5 is a schematic diagram illustrating a processor 130 according to some embodiments of the present disclosure. The processor 130 includes a first circuit 132, a second circuit 134, and a compare circuit 136. In the connection relationship, the first circuit 132 and the second circuit 134 respectively couples to the compare circuit 136. It should be noted that, the processor 130 illustrated in FIG. 5 is for illustrative purposes only, and the embodiments of the present disclosure are not limited thereto.

The first circuit 132 includes an average calculation circuit 132A, a square calculation circuit 132C, a magnification calculation circuit 132D and an output circuit OV1. The average calculation circuit 132A is configured to calculate the average value of at least one delay sample value $C_t$. The average calculation circuit 132A is configured to output the calculated average value to the square calculation circuit 132C. The square calculation circuit 132C is configured to calculate the square of the average value, the output circuit OV1 is configured to output the value calculated by the square calculation circuit 132C to the magnification calculation circuit 132D. The magnification calculation circuit 132D is configured to multiply a square of the average value of the delay sample value $C_t$ and a magnification value. In some embodiments, the magnification calculation circuit 132D is configured to multiply a square of the average value of the delay sample value $C_t$ and the magnification value with a value of 1 so as to obtain the delay related output value $$\left|\frac{1}{L}\sum\nolimits_{t=0}^{L-1}C_t\right|^2.$$

Then, the first circuit 132 transmits the delay related output value $$\left|\frac{1}{L}\sum\nolimits_{t=0}^{L-1}C_t\right|^2$$

to the compare circuit 136.

The second circuit includes a square calculation circuit 134A, an average calculation circuit 134B, a magnification calculation circuit 134D, an output circuit OV2, and an output circuit OV3. The square calculation circuit 134A is configured to operate the square operation to the delay sample value $C_t$ to obtain the power sample value $C_t^2$. The output circuit OV2 is configured to transmit the value calculated by the square calculation circuit 134A to the average calculation circuit 134B. The average calculation circuit 134B is configured to calculate the average value of the power sample value $C_t^2$. The output circuit OV3 is configured to transmit the value calculated by the average calculation circuit 134B to the magnification calculation circuit 134D. The magnification calculation circuit 134D is configured to multiply the value transmitted by the output circuit OV3 and the threshold value parameter. In some embodiments, the magnification calculation circuit 134D multiplies the average value of the power sample value $C_t^2$ and threshold value parameter with the value of $$\frac{\alpha}{(1+\alpha)}$$

so as to obtain the threshold value $$\frac{\alpha}{(1+\alpha)}\frac{1}{L}\sum\nolimits_{t=0}^{L-1}|C_t^2|.$$

Then, the first circuit 132 transmits the threshold value $$\frac{\alpha}{(1+\alpha)}\frac{1}{L}\sum\nolimits_{t=0}^{L-1}|C_t^2|$$

to the compare circuit 136.

The compare circuit 136 is configured to compare whether the delay related output value $$\left|\frac{1}{L}\sum\nolimits_{t=0}^{L-1}C_t\right|^2$$

is larger than the threshold value $$\frac{\alpha}{(1+\alpha)}\frac{1}{L}\sum\nolimits_{t=0}^{L-1}|C_t^2|$$

or not, to output the comparison result, and to determine whether the wireless communication signal satisfies the feature of the wireless network packet or not.

The wireless network packet described above may be a Wireless Local Area Network (WLAN) packet, an Orthogonal Frequency Division Multiple Access (OFDMA) packet, or the like. However, the embodiments of the present disclosure are not limited to the above, and the packets transmitted through the wireless network are all within the scope of the embodiments of the present disclosure.

The processor 130 may be a server, a circuit, a central processor unit (CPU), a microprocessor (MCU), or other equivalent devices having functions of storing, computing, reading data, receiving signals or messages, and transmitting signals or messages. In some embodiments, the transceiver circuit 110 may be a circuit having a function of receiving signals or messages, transmitting signals or messages, or other equivalent functions.

According to embodiments of the present disclosure, it is understood that the embodiments of the present disclosure provide a packet detection method and a communication device, by considering both the size (amplitude) and phase information, the effect of combined detection is achieved. Since both of the delay related output value and the threshold value come from the delay correlation of the same source, compared with the traditional method, it is less affected by the input signal strength, interference size, noise, etc., thereby, it is more suitable for different noise environment. The embodiments of the present disclosure improve the accuracy of packet detection with the noise interference.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A packet detection method, comprising:
   receiving a wireless communication signal;
   calculating a delay correlation function of the wireless communication signal;
   calculating a delay related output value and a threshold value according to the delay correlation function; and
   determining whether the wireless communication signal satisfies a feature of a wireless network packet or not according to the delay related output value and the threshold value;
   wherein the delay related output value and the threshold value are calculated according to a squared value of an average value of the delay correlation function and a variation value calculated from the delay correlation function.

2. The packet detection method of claim 1, wherein calculating the delay related output value and the threshold value according to the delay correlation function further comprises:
   calculating the delay related output value and the threshold value according to a time length parameter.

3. The packet detection method of claim 1, wherein calculating the delay related output value comprises:
   calculating an average value of a plurality of delay sample values according to the delay correlation function; and
   calculating a squared value of the average value of the plurality of delay sample values to obtain the delay related output value.

4. The packet detection method of claim 1, wherein the delay correlation function comprises an amplitude information and a phase information.

5. The packet detection method of claim 1, wherein calculating the threshold value comprises:
   calculating a plurality of delay sample values according to the delay correlation function;
   calculating a plurality of squared values of the plurality of delay sample values to obtain a plurality of power sample values; and
   calculating an average value of the plurality of power sample values.

6. The packet detection method of claim 5, wherein calculating the threshold value comprises:
   multiplying the average value of the plurality of power sample values and a threshold value parameter to obtain the threshold value.

7. The packet detection method of claim 6, wherein a value of the threshold value parameter is between 0 and 1.

8. The packet detection method of claim 1, further comprising:
   determining that the wireless communication signal is the wireless network packet when the delay related output value is larger than the threshold value; and
   determining that the wireless communication signal is a noise when the delay related output value is not larger than the threshold value.

9. The packet detection method of claim 1, wherein calculating the delay related output value and the threshold value according to the delay correlation function comprises:
   calculating the delay related output value and the threshold value according to an antenna parameter.

10. A communication device, comprising:
    a transceiver circuit, configured to receive a wireless communication signal; and
    a processor, configured to calculate a delay correlation function of the wireless communication signal, to calculate a delay related output value and a threshold value according to the delay correlation function, and to determine whether the wireless communication signal satisfies a feature of a wireless network packet according to the delay related output value and the threshold value;
    wherein the delay related output value and the threshold value are calculated according to a squared value of an average value of the delay correlation function and a variation value calculated from the delay correlation function.

11. The communication device of claim 10, wherein the processor is further configured to calculate the delay related output value and the threshold value according to a time length parameter.

12. The communication device of claim 10, wherein the processor is further configured to calculate an average value of a plurality of delay sample values according to the delay correlation function, and to calculate a squared value of the average value of the plurality of delay sample values to obtain the delay related output value.

13. The communication device of claim 10, wherein the delay correlation function comprises an amplitude information and a phase information.

14. The communication device of claim 10, wherein the processor is further configured to calculate a plurality of delay sample values according to the delay correlation function, to calculate a plurality of squared values of the plurality of delay sample values to obtain a plurality of power sample values, and to calculate an average value of the plurality of power sample values.

15. The communication device of claim 14, wherein the processor is further configured to multiply the average value of the plurality of power sample values and a threshold value parameter so as to obtain the threshold value.

16. The communication device of claim 15, wherein a value of the threshold value parameter is between 0 and 1.

17. The communication device of claim 10, wherein when the delay related output value is larger than the threshold value, the processor is further configured to determine that the wireless communication signal is the wireless network packet, and when the delay related output value is not larger than the threshold value, the processor is further configured to determine that the wireless communication signal is a noise.

18. The communication device of claim 10, wherein the processor is further configured to calculate the delay related output value and the threshold value according to an antenna parameter.

19. The communication device of claim 10, wherein the processor comprises:

a compare circuit, configured to compare the delay related output value and the threshold value.

20. The communication device of claim 10, wherein the processor comprises:
a first circuit, comprises:
an average calculation circuit, configured to calculate a first average value of at least one delay sample value according to the delay correlation function;
a square calculation circuit, configured to calculate a first squared value of the first average value; and
a magnification calculation circuit, configured to multiply the first squared value and a magnification value to obtain the delay related output value; and
a second circuit, comprises:
a square calculation circuit, configured to calculate at least one delay sample value according to the delay correlation function, and to calculate at least one second squared value of the at least one delay sample value;
an average calculation circuit, configured to calculate a second average value of the at least one second squared value; and
a magnification calculation circuit, configured to multiply the second average value and a threshold value parameter to obtain the threshold value.

* * * * *